Figure 1:
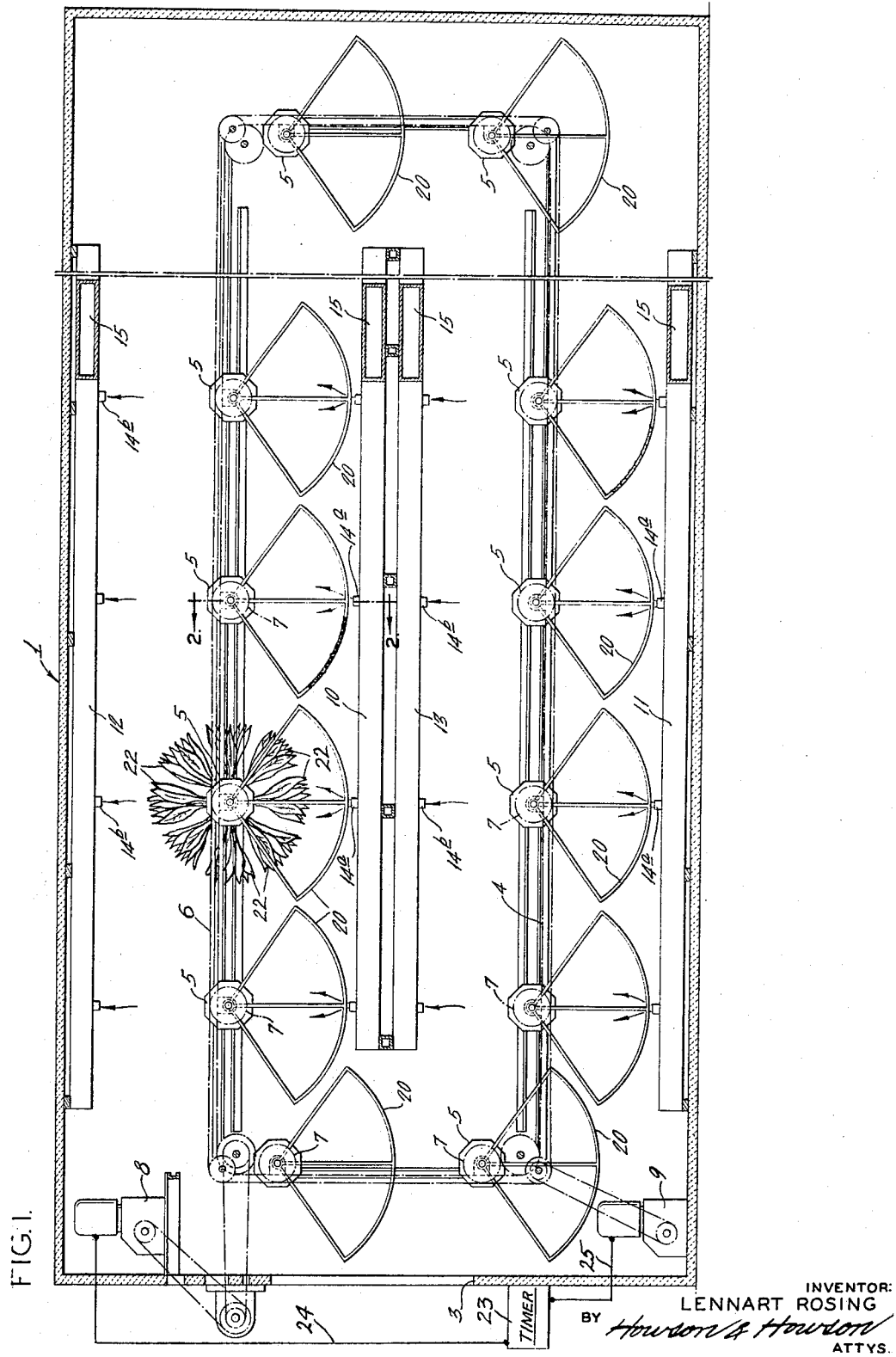

Oct. 25, 1966     L. ROSING     3,280,825
METHOD AND AN APPARATUS FOR MOISTENING HYGROSCOPIC MATERIAL
Filed April 19, 1963     2 Sheets-Sheet 1

INVENTOR:
LENNART ROSING
BY Howson & Howson
ATTYS.

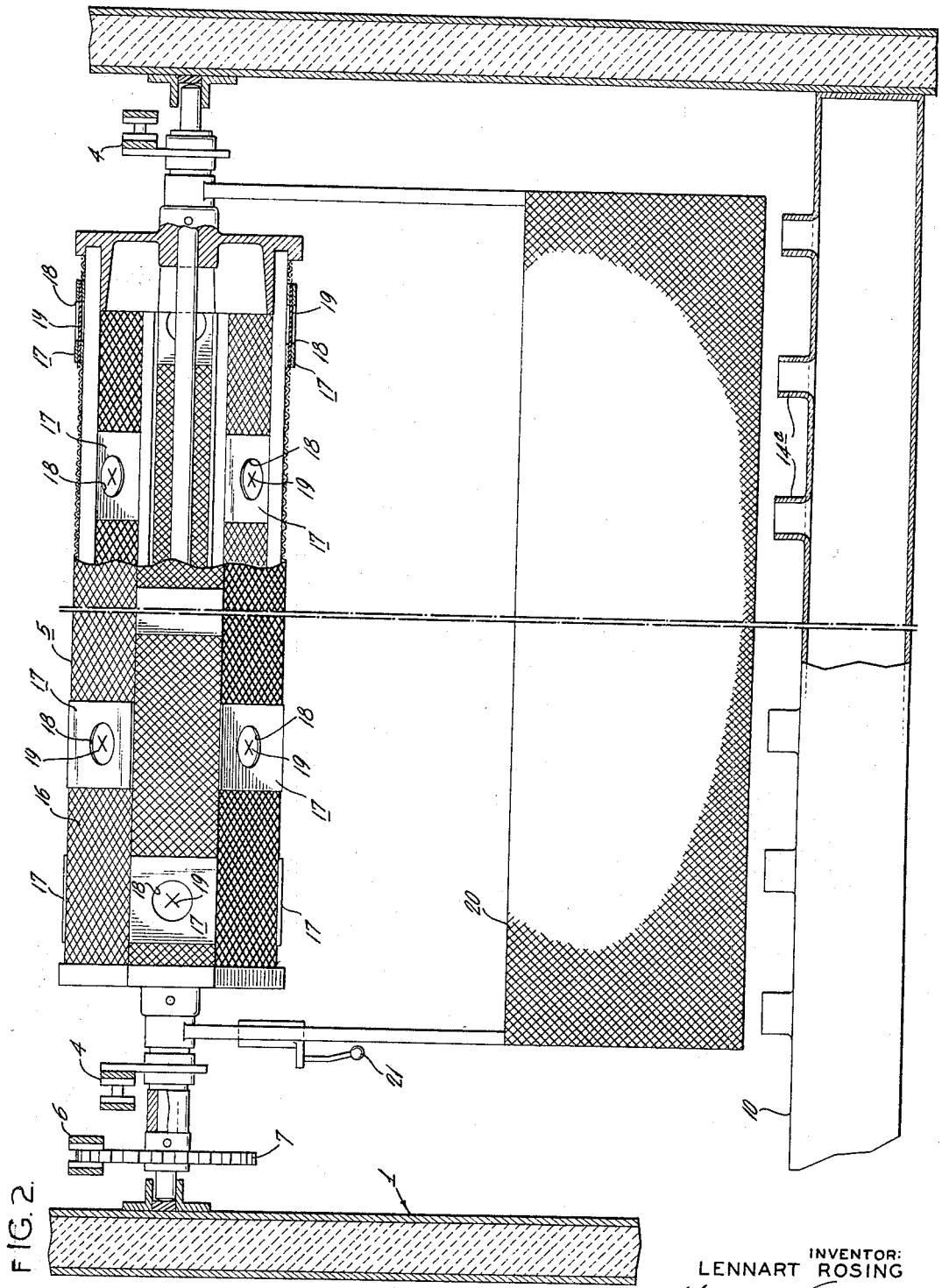

United States Patent Office 3,280,825
Patented Oct. 25, 1966

3,280,825
METHOD AND AN APPARATUS FOR MOISTENING HYGROSCOPIC MATERIAL
Lennart Rosing, Stocksund, Sweden, assignor to Aktiebolaget Svenska Fläktfabriken, Stockholm, Sweden
Filed Apr. 19, 1963, Ser. No. 274,358
11 Claims. (Cl. 131—136)

This invention relates to a method and apparatus for moistening hygroscopic material such as tobacco leaves, by using moist air as treating medium. In order to be able to store such material or to use it in the manufacturing process in question, it is in most cases necessary to subject the material to moistening in order to produce a definite moisture content therein. This is usually achieved by subjecting the material to be treated with heated moist air. In order to shorten the time of treatment as much as possible, air of high relative humidity is used. In practice, however, it has proved difficult to maintain the humidity at the desired high value without partial condensation and therefore water separation, which results in the formation of strains and in non-uniform distribution of the moisture content. In the case of easily damageable and brittle material, such as tobacco leaves, which does not permit stirring or loosening of its structure during its treatment so as to provide a continued renewal of the contact surface of the material, the high relative humidity constitutes a risk. This is due to the fact that the desired moisture content is obtained only in part of the material, because the time of treatment with a highly humid treating medium is too short to render a uniform distribution of the moisture.

The present invention provides a new method and apparatus which is adapted to utilize a short treatment time without involving the aforesaid risks. The invention is characterized in that the material is supplied intermittently through a substantially closed treating space, in such a manner, that in the stationary periods the material is subjected to the effect of the treating medium which is supplied at a high velocity and in the form of a curtain. However, during the periods the material is moving it is withdrawn from the treating medium and caused to change its position continuously by rotation, so that the material is loosened and softened and its moisture content uniformly distributed.

Due to the intermittent treatment afforded to the material and the possibility of obtaining a moisture equalization during the intervals, and further due to the continual change in the position of the material, the moistening operation according to the invention, can be carried out without the aforementioned risks in a very short time resulting in an entirely uniform distribution of moisture within the material.

The treating medium in the curtains is preferably supplied in an amount and/or at a velocity which is increased successively in the direction of feed. The moistening operation may be carried out in two or more steps, in such a manner, that the moisture content of the treating medium can be individually adjusted at each step. The treatment time may be adjusted to the material in question in a known manner by controlling the feed speed.

In order to be able to feed a new material of a type different than that still under treatment, the effective time of treatment may be adjusted in one or several of the steps by disconnecting one or more of the curtains of treating medium. Such disconnection of any desired number of curtains is preferably effected automatically by means of an impulse received from a "rider" on the conveyor provided for feeding the material.

The invention relates further to apparatus for carrying out the method. The apparatus, in the present instance, comprises an endless conveyor arranged within a closed space for conveying the material to be treated and provided with transverse material carrying members which are rotatably mounted between two chains. Further distribution boxes for the treating medium are disposed along the conveying path and connected to means for treating and circulating the medium. The apparatus is characterized in that the distribution boxes are mounted on both sides of the conveying plane and provided with supply or suction slots equally spaced and orientated across the conveying plane. The conveyor is adapted to be operated intermittently at intervals adjusted to the interspacing of the slots, in such a manner, that during the stationary periods the carrying members are located between co-operating supply and suction slots in the distribution boxes.

Other objects and a fuller understanding of the invention may be had by referring to the following description and claims taken in conjunction with the accompanying drawings in which:

FIG. 1 is a longitudinal section view through apparatus constructed in accordance with the present invention; and FIG. 2 is an enlarged fragmentary view of a carrying member taken along line 2—2 of FIG. 1.

Referring now to the drawings, a casing 1 encloses a treating space and has in one front wall a material supply and discharge opening 3. A chain conveyor 4 comprises two endless chains with at least one transverse, material carrying member 5 therebetween, in the present instance two carrying members. The carrying members are rotatably mounted on the conveyor and are adapted to be rotated during the operative steps of the conveyor 4 by an additional chain 6 which engages with sprockets 7 mounted on the carrying members 5. In accordance with the invention, the conveyor 4 is driven intermittently by the conveyor drive means 8 while the additional chain 6 is driven by the drive means 9. The drive means 8 and 9 may be timed for the intermittent movement as by a timer 23 connecting them by leads 24 and 25. Below both parts of the conveyor, and as best illustrated in FIG. 1, supply distribution boxes 10 and 11 are mounted for supplying moisture-laden, gaseous treating medium in the present instance high humidity air. Above each portion of the conveyor, similar receiving boxes 12 and 13 are mounted in like manner for receiving the treating medium. Slots 14a and 14b are provided in the distribution boxes to supply and suck respectively the treating medium through the material being treated. In the embodiment shown in FIG. 1 the slots are spaced equally and orientated across the conveying plane so that each pair of slots, i.e. 14a and 14b, when in operation, cause the formation of a curtain of treating medium. The distribution boxes are connected at 15 to means (not shown) for conditioning and circulating the treating medium. The carrying members 5, in the present instance as is shown in the drawings, are constructed as a polygonal sided cylinder having a perforated shell 16 and provided with material holding means 17 for holding discrete groups, quantities or bundles of the material, such as the tobacco bundles 22 shown in FIG. 1. The holding means 17 are mounted in such a manner that their centers are staggered in relation to adjacent sides. The holding means comprise openings 18 arranged in the side surfaces of the rolls and covered by a slotted diaphragm 19 of rubber or elastic material. In order to obtain the best possible engagement with the material to be treated and at the same time to permit gentle handling of the material, two diaphragms may preferably be provided, one spaced somewhat below the other.

In order that the air curtain may be distributed across the material to be treated a cage-type perforated air distribution screen 20 is disposed below the carrying members 5 and pivotally mounted thereon. In cases where the apparatus is to be fed with a different material, the properties of which require a different treatment time, a rider 21 is secured on the conveyor, the rider being adapted to actuate contact means in the apparatus to give an impulse for automatic disconnection of a desired number of treating medium curtains. In such cases, the rider is placed on the first carrying member charged with the new material.

What I claim is:

1. A method of moistening hygroscopic material by passing a moisture-laden, gaseous treating medium over the material, comprising the steps of conveying discrete groups of said material through a substantially closed treating space, intermittently arresting the movement of said discrete groups of material through said space a plurality of times, passing separate curtains of said treating medium over at least some of said groups of material during intervals of non-movement of said groups through said space, removing said discrete groups from said curtain and rotating each of said discrete groups of material between successive curtains and during intervals of movement so as to uniformly moisturize the material.

2. A method according to claim 1 including the step of supplying an increased quantity of said medium in each curtain in the direction of movement.

3. A method according to claim 1 including the step of supplying a quantity of said medium at an increased velocity in each curtain in the direction of movement.

4. A method of treating bundles of hygroscopic material according to claim 1 including the step of interrupting at least one of said curtains in order to increase the treatment time.

5. An apparatus for moistening bundles of hygroscopic material by passing moisture-laden gaseous treating medium over said bundles, comprising a conveyor having a plurality of equally spaced, rotatably mounted, material carrying members thereon, said material carrying members mounted substantially transverse to the direction of conveyor movement and adapted to support said material during movement of said conveyor, means to cause rotation of said members, opposed distribution boxes, one mounted on one side of the plane of said conveyor and spaced therefrom, the other mounted on the other side of the plane of said conveyor and spaced therefrom, a plurality of inlet slots in one of said boxes aligned with a plurality of outlet slots in the other of said boxes, each of said aligned outlet and inlet slots forming a cooperating pair so as to provide a curtain of said treating medium substantially transverse to the path of movement of the conveyor, each of said pairs spaced along the conveyor a distance substantially equal to the spacing between said carrying members, drive means to operate said conveyor intermittently and timed so that during an interval of non-movement said carrying members are located between cooperating inlet and outlet slots.

6. An apparatus for moistening bundles of hygroscopic material in accordance with claim 5 wherein said conveyor comprises a pair of spaced chains, and wherein said material carrying members comprise polygonal rolls having a perforated shell and a plurality of holding means for the material, each of said holding means staggered with respect to adjacent holding means in an adjacent side of said roll.

7. An apparatus for moistening bundles of hygroscopic material in accordance with claim 6 wherein said material to be treated is tobacco arranged in bundles and wherein said holding means comprises a compliant slotted diaphragm adapted to receive and clamp said bundles.

8. An apparatus for moistening bundles of hygroscopic material in accordance with claim 6 wherein said carrying members have a sector shaped, air distribution screen depending from said members, and pivotably secured thereto.

9. An apparatus for moistening bundles of tobacco by passing moisture-laden gaseous treating medium over said bundles, comprising in combination a conveyor having a pair of spaced chains carrying a plurality of equally spaced, rotatably mounted, material carrying members thereon, said material carrying members comprising polygonal rolls having a perforated shell and including a plurality of holding means for the tobacco bundles, each of said holding means staggered with respect to adjacent holding means in an adjacent side of said roll, said rolls being mounted substantially transverse to the direction of conveyor movement, and drive means adapted to cause movement of said conveyor; a second drive means connecting each of said rolls so as to cause rotation of said rolls with respect to said conveyor, opposed distribution boxes, one mounted on one side of the plane of said conveyor and spaced therefrom, the other mounted on the other side of the plane of said conveyor and spaced therefrom, a plurality of inlet slots in one of said boxes aligned with a like number of outlet slots in the other of said boxes, each of said aligned outlet and inlet slots forming a cooperating pair so as to provide a curtain of said treating medium substantially transverse to the path of movement of the conveyor, each of said pairs of spaced along the conveyor a distance equal to the spacing between said carrying members, said conveyor operable intermittently and timed so that during an interval of non-movement said carrying members are located between cooperating inlet and outlet slots.

10. An apparatus for moistening bundles of tobacco in accordance with claim 9 wherein said holding means comprising a complaint slotted diaphgram adapted to receive and clamp said bundles.

11. An apparatus for moistening bundles of tobacco in accordance with claim 10 wherein said carrying members have a sector shaped air distribution screen depending from said members and pivotally secured thereto.

References Cited by the Examiner

UNITED STATES PATENTS

| 626,202 | 5/1899 | Dula | 131—136 |
|---|---|---|---|
| 1,093,011 | 4/1914 | Roberts | 34—208 X |
| 1,307,270 | 6/1919 | Richards | 34—207 X |
| 2,002,060 | 5/1935 | Harris | 131—134 |
| 2,121,370 | 6/1938 | Touton | 131—136 X |
| 2,219,166 | 10/1940 | Schaefer | 34—208 |
| 2,807,892 | 10/1957 | Gerrish | 34—208 X |

FOREIGN PATENTS 587,945   1/1935   Germany.

FREDERICK L. MATTESON, JR., *Primary Examiner.*

NORMAN YUDKOF, *Examiner.*

J. SOFER, A. D. HERRMANN, *Assistant Examiners.*